Patented June 17, 1924.

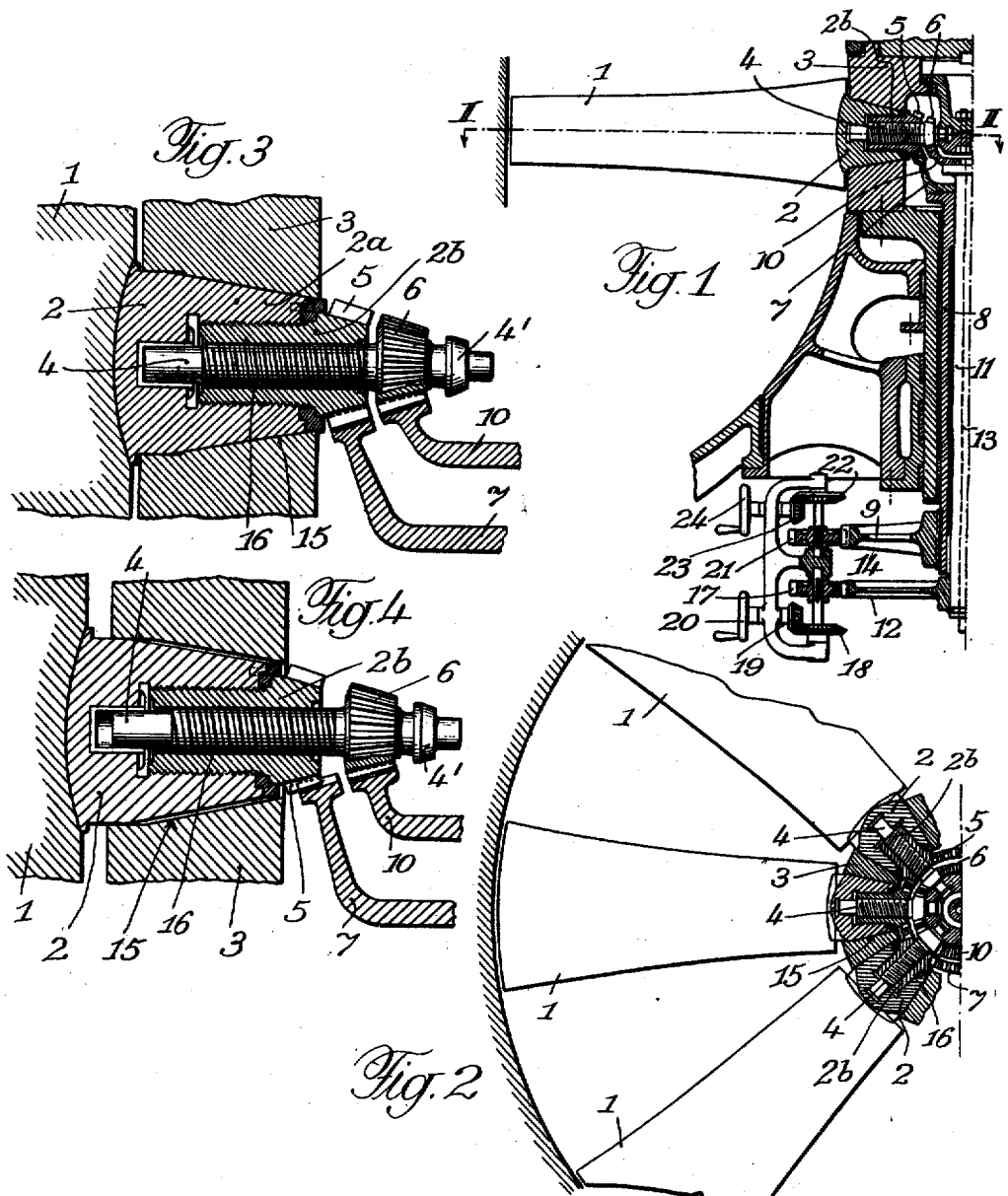

1,497,723

UNITED STATES PATENT OFFICE.

ALBERT HUGUENIN, OF ZURICH, SWITZERLAND.

WATER TURBINE.

Application filed June 4, 1923. Serial No. 643,281.

*To all whom it may concern:*

Be it known that I, ALBERT HUGUENIN, a citizen of the Republic of Switzerland, residing at Zurich, Switzerland, have invented certain new and useful Improvements in Water Turbines, of which the following is a specification, reference being had therein to the accompanying drawing.

The present invention relates to improvements in water turbines and particularly to rotor wheels for water turbines adapted to be flown through by the driving medium in two directions that are opposite to each other.

The angles of entrance and of outlet of a rotor wheel influence to a considerable degree the efficiency of turbines as the admission of the driving medium without shock and the discharge losses depend on the size of these angles. With turbines rotating only in one direction it is a comparatively easy matter for the designer to adapt these angles to the given quantity of water and speed and to obtain thereby a good efficiency. These conditions are, however, changed when the turbine has to rotate in both directions as is for instance the case with turbines installed in tidal-water-power-installations, in which the driving medium has to flow through the turbines in two directions that are opposite to each other. With rotor wheels having fixed blades a comparatively high efficiency may be obtained when the rotor wheel rotates in one direction but at the expense of the efficiency for the rotation in the other direction. If too low an efficiency has to be avoided for the rotation in one direction a determined decrease of the efficiency for both directions of rotation has to be admitted with rotor wheels having fixed blades.

In order to obtain a high efficiency with water turbines through which the driving medium may flow in two directions that are opposite to each other according to the present invention the blades of the rotor wheel are rotatably arranged in the latter and are fixed to the boss of the rotor wheel in such a manner that the fixation may be loosened and re-established upon the adjustment of the blades into a determined angular position relatively to the axis of the runner wheel.

Each blade of the rotor wheel is preferably provided with a conical seat fitting into a conical bore of the wheel boss, and the loosening of the fixation of the blades may be obtained by a relative movement radially to the axis of the rotor wheel between the conical seat and a gudgeon acting as a bearing for the respective blade. Besides the means that are for loosening of the connection between the blades and the boss of the wheel, means may be provided for effecting a turning of the loosened blades.

A constructional example of the subject matter of the present invention is illustrated on the accompanying drawings, in which:

Fig. 1 is a vertical section through a portion of a water turbine provided with a rotor wheel according to the invention, and Fig. 2 is a horizontal section along line II—II of Fig. 1 in which the working faces of the blades are shown in a plan view.

Fig. 3 shows on a larger scale a section through the means for fixing a blade to the boss and Fig. 4 is a section similar to that shown in Fig. 3 with the fixing means, the fixation between blade and boss being loosened.

In the drawings, 1 denotes the blades of the rotor wheel. Each of these blades is provided with a conical seat 2 which fits into a conical bore 15 of the boss 3 of the rotor wheel. The conical seats 2 of the blades consist of two parts $2^a$ and $2^b$ (Fig. 3) rigidly screwed together, of which $2^b$ is provided with internal thread 16, co-operating with a thread provided on a gudgeon or pin 4 that serves as a journal to the respective seat 2. Each part $2^b$ is further provided with a gear wheel 5, and a gear wheel 6 is provided on each gudgeon 4 as well as a collar 4' adapted to prevent an axial displacement of the gudgeon. The gear wheels 5 are in mesh with a gear wheel 7 common to them which is rigidly fixed on a hollow shaft 8. On the latter a gear wheel 9 is further rigidly mounted. The gear wheels 6 of the gudgeons 4 co-operate with a gear wheel 10 common to all the gear wheels 6, the gear wheel 10 being rigidly fixed to a shaft 11 surrounded by the shaft 8. To the shaft 11 a gear wheel 12 is keyed. The shaft 11 is provided with a bore 13 extending in the axial direction and serving to supply a lubricant to the centre of the rotor wheel, from where the lubricant is led by means of channels to the single movable parts of the rotor wheel. The shafts 8 and 11 project into a space 14 in which are arranged the means co-operating with the gear wheels 9 and 12. These means consist of a pinion 17 in mesh with the gear wheel 12, bevel wheels 18, 19 and hand wheel 20 for operating the gear wheel 12 and of pinion 21, gear wheels 22, 23 and hand wheel 24 for operating the gear wheel 9.

Normally the various parts occupy the positions shown in Figs. 1, 2 and 3, in which the conical seat 2 of each blade 1 of the rotor wheel is strongly pressed against a conical surface in the boss 3, so that the blades 1 are held in a fixed position relatively to the axis of the rotor wheel. In case a turning of the blades 1 has to be effected, first of all the shaft 11 is turned by means of the gear wheel 12, the gear wheel 9 and the shaft 8 being held in a fixed position so that a turning of the blades 1 cannot occur. The turning of the shaft 11 causes a turning of the gudgeons 4 and by the action of the screw thread 16 a movement of the seat 2 and thereby of the blades 1 in the radial direction relatively to the vertical axis of the rotor wheel is brought about, the parts 1, 2 being moved into the position shown in Fig. 4. Thereby the fixation of the blades 1 is loosened as the seats are so longer pressed against the boss 3. As soon as the fixation of the blades is loosened in the above described manner the shaft 8 is rotated by means of the gear wheel 9 together with the same angular speed as the shaft 11 and gear wheel 12 in order to effect a turning of the loosened blades 1 about their longitudinal axes. As soon as the blades 1 are turned about their longitudinal axes through the required amount, the wheel 9 and the pinion 21 driving the latter are held in a fixed position, whereupon the shaft 11 is rotated in a direction opposite to that in which it had been previously rotated so that the blades 1 are moved in a radial direction inwards and the conical seats 2 are pressed against the conical surfaces in the boss 3, whereby the blades 1 are fixed on being thus rigidly connected with the boss 3 of the rotor wheel.

The above described arrangement permits to turn the blades 1 of the rotor wheel about their longitudinal axes through any desired angle and to fix the blades to the boss 3 of the rotor wheel in any angular position relatively to the axis of the latter. Preferably a loosening of the fixation is carried out when the rotor wheel is standing still. However, if it be required, provision may be made that an adjustment of the blades can be carried out during the running of the rotor wheel.

I claim:

1. In a rotor wheel for water turbines adapted to be flown through by the driving medium in two directions that are opposite to each other, a boss provided with conical bores, radially disposed blades provided with conical seats fitting into said conical bores of the boss, means adapted to simultaneously turn all the conical seats and thereby the blades into a desired angular position relatively to the axis of the rotor wheel, and means adapted to displace said conical seats towards the axis of the rotor wheel for pressing the seats against the conical bores in order to fix the blades to the boss or away from the axis of the rotor wheel in order to loosen said fixation previous to turning the blades into a desired position.

2. In a rotor wheel for water turbines adapted to be flown through by the driving medium in two directions that are opposite to each other, a boss provided with conical bores, radially disposed blades provided with conical seats fitting into said conical bores of the boss, gudgeons acting as journals for said conical seats, means adapted to simultaneously turn all the gudgeons and thereby the conical seats with the blades carried by them into a desired angular position relatively to the axis of the rotor wheel, and means adapted to displace said conical seats relatively to said gudgeons towards the axis of the rotor wheel for pressing the seats against the conical bores in order to fix the blades to the boss or away from the axis of the rotor wheel in order to loosen said fixation previous to turning the blades into a desired position.

3. In a rotor wheel for water turbines adapted to be flown through by the driving medium in two directions that are opposite to each other, a boss provided with conical bores, radially disposed blades provided with conical seats fitting into said conical bores of the boss, gudgeons acting as journals for said conical seats and being screwed into the latter, pinions on said conical seats, a gear wheel co-operating with said pinion, a hollow shaft to which said gear wheel is fixed, means adapted to rotate said hollow shaft and to cause thereby a simultaneous turning of all the blades into any desired angular position relatively to the axis of the rotor wheel, a pinion on each gudgeon, a gear wheel co-operating with all of said pinions, a shaft arranged inside said hollow shaft and on which said gear wheel is fixed, means to rotate said shaft and to cause thereby a rotation of all the gudgeons and a relative displacement between said conical seats and the conical bores in the boss whereby the seats are pressed against the conical bores in order to fix the blades to the boss when the shaft is turned in one direction or the seats are moved away from the conical bores in order to loosen said fixation previous to turning the blades into a desired position when the shaft is turned in the opposite direction.

In testimony whereof I affix my signature.

ALBERT HUGUENIN.